US 7,890,882 B1

(12) United States Patent
Nelson (10) Patent No.: US 7,890,882 B1
(45) Date of Patent: Feb. 15, 2011

(54) CONTENT AND PROXIMITY BASED WINDOW LAYOUT OPTIMIZATION

(75) Inventor: John Nelson, Normandy Park, WA (US)

(73) Assignee: Adobe Systems Incorporated, San Jose, CA (US)

( * ) Notice: Subject to any disclaimer, the term of this patent is extended or adjusted under 35 U.S.C. 154(b) by 288 days.

(21) Appl. No.: 11/408,832

(22) Filed: Apr. 20, 2006

(51) Int. Cl.
*G06F 3/048* (2006.01)

(52) U.S. Cl. ...................................... 715/788; 715/792

(58) Field of Classification Search ................. 715/788, 715/792
See application file for complete search history.

(56) References Cited

U.S. PATENT DOCUMENTS

| | | | | | |
|---|---|---|---|---|---|
| 5,060,170 | A | * | 10/1991 | Bourgeois et al. | ........... 715/788 |
| 5,577,187 | A | * | 11/1996 | Mariani | ....................... 715/792 |
| 5,977,973 | A | * | 11/1999 | Sobeski et al. | .............. 715/798 |
| 6,008,809 | A | * | 12/1999 | Brooks | ........................ 715/792 |
| 2006/0224992 | A1 | * | 10/2006 | Rossi et al. | ................. 715/781 |
| 2007/0006095 | A1 | * | 1/2007 | Feng | ........................... 715/800 |

OTHER PUBLICATIONS

Arrington, Michael, "Google Sidebar to Launch Monday," (visited Apr. 20, 2006) <http://www.techcrunch.com/2005/08/21/google-sidebar-to-launch-monday/>.
"Google Desktop—Features," (visited Apr. 20, 2006) <http://desktop.google.com/features.html>, pp. 1-5.
"Google Desktop: Download Plug-ins," (visited Apr. 20, 2006) <http://desktop.google.com/plugins/>.

* cited by examiner

*Primary Examiner*—William L Bashore
*Assistant Examiner*—Ashraf Zahr
(74) *Attorney, Agent, or Firm*—Robert C. Kowert; Meyertons, Hood, Kivlin, Kowert & Goetzel, P.C.

(57) ABSTRACT

A content and proximity based window layout optimizer is described, including receiving a request to adjust one or more windows in a user interface, the one or more windows having content, determining an adjustment order based on the request, the adjustment order comprising a sequence of the one or more windows on which the request to adjust is applied successively, adjusting the one or more windows based on the request, the adjustment order, and the content of the one or more windows being adjusted.

29 Claims, 10 Drawing Sheets

CONTENT AND PROXIMITY BASED WINDOW LAYOUT OPTIMIZATION

FIELD OF THE INVENTION

The present invention relates generally to software. More specifically, content and proximity based window layout optimization is described.

BACKGROUND OF THE INVENTION

Some user interface environments utilize child window stacks to organize information. A child window stack includes a plurality of windows referred to as child windows. The child windows are referred to as children of the child window stack and each pair of adjacent child windows is separated by a splitter along the shared window edge. The splitter is used to manipulate and/or adjust the size of the child window. The child window stack may be established in a user interface environment. The child windows may include a variety of information and a variety of quantity of information. Scrolling and resizing the windows is often used to view the information contained in the window. The stack has a set amount of space that is maintained and the windows can be manipulated within that space. The child window stack utilizes the set amount of space by distributing or subdividing the space among the child windows.

In some environments, when more space is allotted to (or taken from) the child windows, the allotted space can be distributed or removed evenly among the child windows. That is, an equal amount of additional space is applied to each window in the stack. For example, a task bar in some operating systems functions this way. As each task is opened a pre-sized icon is added to the task bar until the task bar is full. Upon the next task being opened and an icon added to the full task bar, each of the icons are shrunk to the same smaller size regardless of the content. Although this method may be equitable, it is inefficient. Many windows do not have sufficient content to make use of the additional space, or have more content than the reduced space allows. That is, while they are given the same extra space as the other child windows, some windows do not have the content to utilize the additional space and display white space as a result. This wastes valuable screen space that could be used to display information contained in other windows in the stack.

In other environments, when a splitter is moved, the windows on either side of the splitter are adjusted, but the other windows in the stack remain unaffected. This causes some windows to display white space. That is, some windows may be sized larger than is warranted by the content, and as a result display blank or white space instead of content. This situation can result in a user having to continuous adjust the windows to get the desired content in each window visible.

Thus, what is needed is a window layout optimization without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Window layout optimization may include receiving a request to adjust one or more windows in a user interface, the one or more windows having content, determining an adjustment order based on the request, the adjustment order being a sequence of the one or more windows on which the request to adjust is applied successively, adjusting the one or more windows based on the request, the adjustment order, and the content of the one or more windows being adjusted. Window layout optimization may also include a user interface including a plurality of container windows separated by splitters, one or more of the plurality of container windows having a plurality of child windows separated by splitters, each of the plurality of child windows having content, the user interface configured to receive a request to adjust one or more of the plurality of child windows, a sequencing module configured to determine a window sequence, the window sequence being a succession of child windows on which the request is applied, an adjusting module configured to adjust one or more of the plurality of child windows based on the request, the window sequence, and the content of the one or more of the plurality of child windows being adjusted.

Figure 1A:
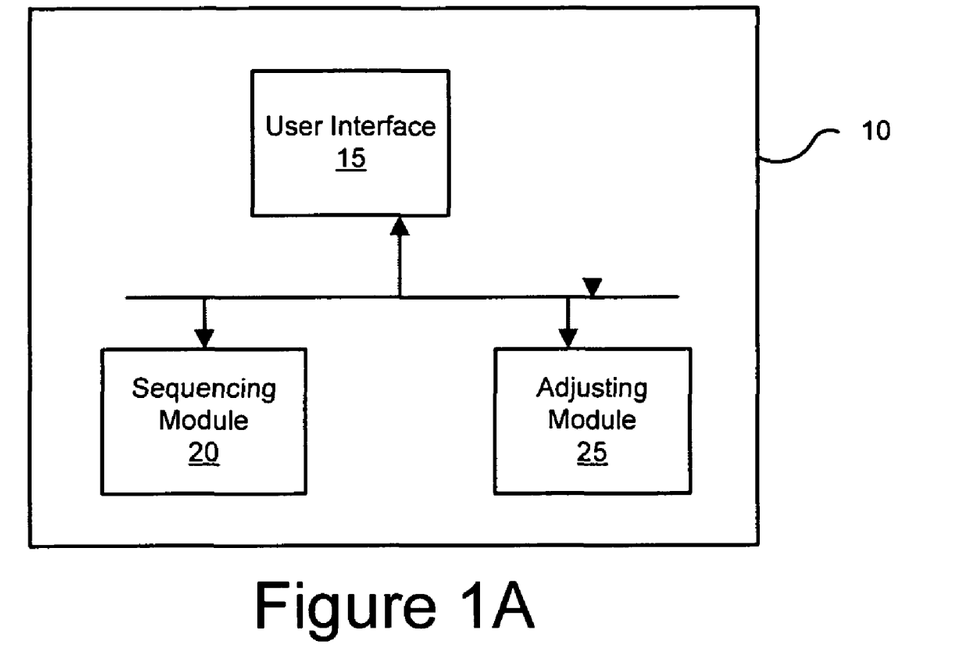
FIG. 1A illustrates an exemplary content and proximity window layout optimizer system.

FIG. 1A illustrates an exemplary content and proximity window layout optimizer system 10. In some embodiments, an exemplary content and proximity window layout optimizer system 10 may include a user interface 15, a sequencing module 20, and an adjusting module 25. User interface 15 may include a docked window environment such as that illustrated in FIG. 1B. The docked window environment may include container windows separated by splitters. The splitters may be used to manipulate the container windows. Each container window may include one or more child windows. When more than one child window is included in a container window it may be referred to as a child window stack. In a child window stack, the child windows may be separated by splitters. The splitters may be used to manipulate the child windows. The child windows may contain content. Content may include data, database forms, charts, graphs, images, and other digital information. User interface 15 may be included in a computer application such as an image management package. The organization of the container windows and child windows in the docked window environment may be referred to as a layout. The user interface may accept requests to adjust the layout. In some embodiments, a request may be a message, command, or other input (e.g., user, system, default-specified, or other) that, when received, initiates or triggers a responsive action, message, command, action, or data to be sent. Here, the requests or commands may come in the form of movement of a splitter, the adjustment of a window control element, the addition of a child window, the removal of a child window, or other layout altering manipulations. Each of these or other requests may add or remove space from a child window stack. Sequencing module 20 may determine a sequence of windows on which to perform adjustments to the user interface or to the layout. In some embodiments, the sequence may be in a topmost and leftmost to bottommost and rightmost window order. In some embodiments, the sequence may be in an order of proximity to a manipulation element such as a splitter. Adjusting module 25 may perform the requested adjustment in the order determined by the sequencing module. In some embodiments, adjusting module 25 may calculate the available space that is to be added to, or taken away from, a child window stack. In some embodiments, the available space may be the difference between the starting position of a splitter and the ending position of a splitter. In some embodiments, the available space may be the difference between the starting size of a container window and the ending size of a container window. In other embodiments, there may be other methods of calculating the available space.

Figure 1B:
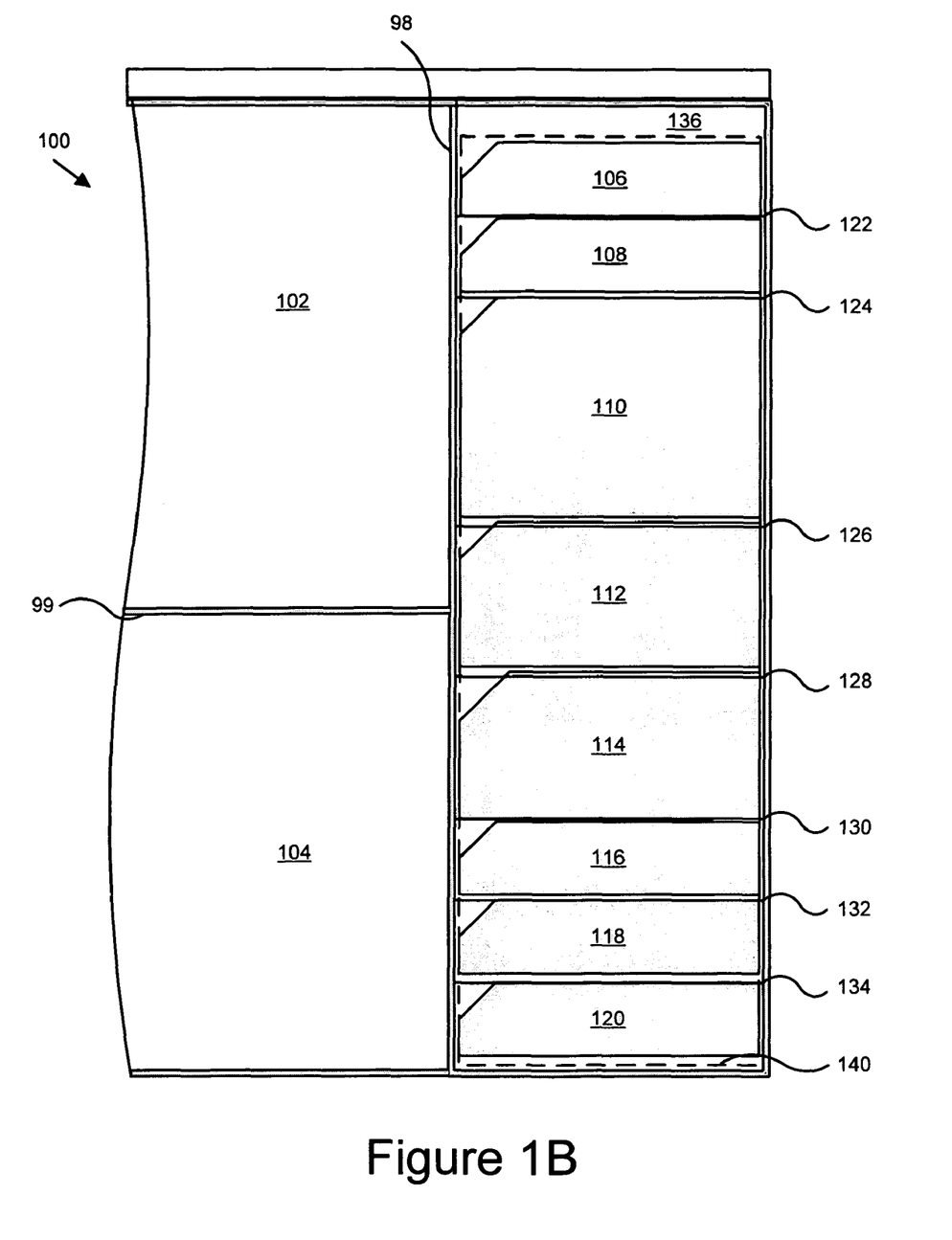
FIG. 1B illustrates an exemplary docked window environment.

FIG. 1B illustrates an exemplary docked window environment 100. In some embodiments, docked window environment 100 may include container window 102, container window 104 and container window 136. Container window 102 and container window 104 may be separated by splitter 99. The two container windows 102 and 104 may be separated from container window 136 by splitter 98. Container window 136 may include child window stack 140. Child window stack 140 may include child windows 106, 108, 110, 112, 114, 116, 118, and 120 and splitters 122, 124, 126, 128, 130, 132, and 134. The child windows and the splitters may be aligned in a vertical manner. That is, the top edges and bottom edges of the child windows are touching or abutting the broad side or long side of the splitters. For example, the bottom edge of child window 114 and the top edge of child window 116 abut a single splitter 130. In another implementation the child window stack may be configured horizontally. That is, the broad side of the splitters may abut, touch, or reside adjacent to the left and right edges of the child windows instead of on the top and bottom edges of the child windows. Container windows 102 and 104 may contain a single child window or a child window stack. Splitter 99 may be used to manipulate the size of container windows 102 and 104, while splitter 98 may be used to manipulate the size of container windows 102, 104, and 136. For example, if splitter 99 is moved upward, container window 102 may be reduced in size while container window 104 may be enlarged in size.

Each child window may have a set of parameters. The set of parameters may include a minimum size parameter, a maximum size parameter, an "exceed minimum" parameter, and an "exceed maximum" parameter. The minimum size parameter may determine the size of the child window at which a minimum of content may be displayed. This minimum content may be referred to as minimum significant content. That is, the minimum content may be the minimum content for that child window that is significant or important to a user. The minimum size parameter may be used as a guide when a splitter is moved. In other words, when a request to adjust a user interface is received a child window may be sized to its minimum size indicated by the minimum size parameter.

The maximum size parameter may determine the size of the child window at which a maximum of content may be displayed. The maximum of content may be referred to as a maximum of significant content. That is, the maximum content may be the maximum content for that child window that is significant or important to a user. The maximum size parameter may be used as a guide for sizing a child window when a request to adjust a user interface is received. In other words, when a splitter changes position a child window may be sized to its maximum size indicated by the maximum size parameter.

The "exceed minimum" parameter may determine if the child window may be sized below the minimum size parameter. That is, if indicated, the child window may be sized below the minimum significant content. In some embodiments, the child windows may be sized to zero. In some embodiments, at size zero, a title bar and control devices may be displayed. The "exceed maximum" parameter may determine if the child window may be sized above the maximum size parameter. That is, if indicated, the child window may be sized greater than the maximum size parameter. In some embodiments, the "exceed maximum" parameter may permit a child block to be sized as large as the docked window environment may allow, taking into account the size parameters of the other child windows in the environment.

Splitters 122-134 may be used to adjust child windows 106 through 120. That is, one of splitters 122-134 may be dragged via an input device in an upward or downward direction to adjust the size of at least the adjacent child windows. Sizing may include a change in the size of a child window or the change in one dimension of a child window and may be referred to as adjusting, manipulating, resizing, enlarging, lengthening, widening, elongating, extending, growing, shortening, expanding, reducing, shrinking, or the like. In a horizontal child window stack implementation, the splitter may be dragged or moved in a horizontal direction such as left or right.

The movement of the splitter may cause the simultaneous sizing of adjacent child windows on either side of the splitter. For example, splitter 126 may be dragged via a mouse upward, thus enlarging child window 112 while simultaneously shrinking child window 110. When the splitter is dragged in an upward motion the windows below the splitter may be expanded in size and simultaneously the windows above the splitter may be reduced in size. When the splitter is dragged in a downward motion, the windows above the splitter may be expanded in size while simultaneously the windows below the splitter may be reduced in size. The direction of the motion of the splitter may be referred to as the push side of the splitter. That is, if splitter 130 is moved in an upward motion in a vertical stack such as stack 140, the splitter may be referred to as "pushing" window 114, or window 114 may be considered on the "push-side" of splitter 130. Similarly, the opposite direction to the motion of the splitter may be referred to as the "pull-side" of the splitter. That is, if splitter 130 is moved in an upward motion, the splitter may be referred to as "pulling" window 116, or window 116 may be on the "pull-side" of the splitter.

In some embodiments, the movement of, or change in position of the splitter may be used to determine the sizing of the child windows. In other words, the physical distance traversed by the splitter may determine the available space to be applied to the child windows one either side of the splitter. In some embodiments, available space may be referred to the difference between the beginning position of the splitter and the ending position of the splitter. For example, if the difference in the beginning position of splitter 128 and the ending position of splitter 128 is 100 pixels in an upward direction, 100 pixels may be added to pull side child windows 114 through 120, and 100 pixels may be taken away from push side child windows 106-112. The change in position of the splitter, or the available space, may determine the magnitude or quantity of space to be applied to the push-side child windows and pull-side child windows. The magnitude may be added to the pull-side windows and subtracted from the push-side windows. Available space may be referred to as adjustment space, additional space, window space, screen space, or the like. In some embodiments, the change in size of a container window may determine the available space. In yet other embodiments, there may be other methods of calculating available space.

Figure 1C:
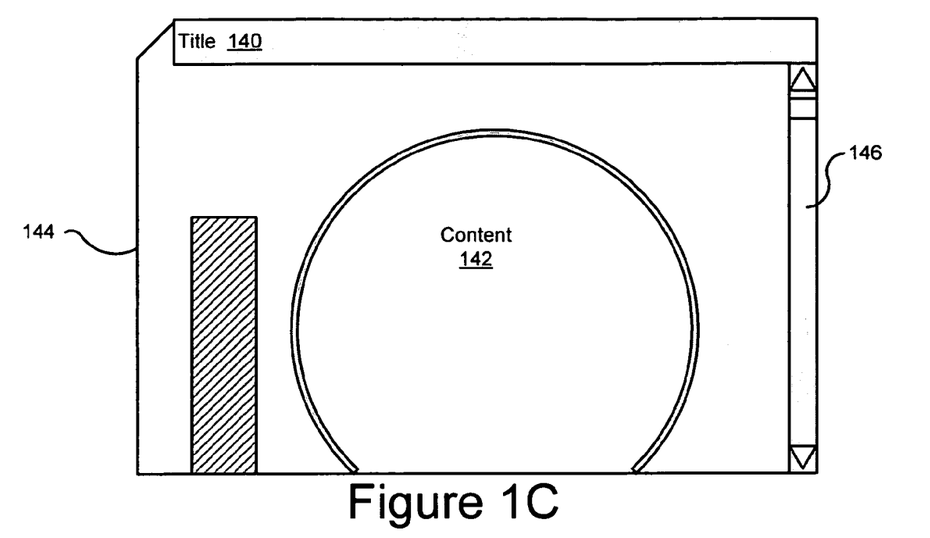
FIG. 1C illustrates an exemplary child window.

FIG. 1C illustrates an exemplary child window 144. In some embodiments, child window 144 may include a title bar 140 and content 142. Title bar 140 may include one or more window control elements (not shown) and a title. Child window 144 may also be referred to as window 144. Child window 144 may include scroll bar 146 which may be used to scroll through content 142. Content 142 may include a variety of content types. Some example content types may include: text, text files, images, image files, spreadsheets, spreadsheet files, graphics, graphic files, charts, forms, database query forms, dynamic database data, folder structures, tools, icons, thumbnails, or any other or combination of digital information. Content may include one line of a child window, or more content than may be displayed in the docked window environment, or other alternatives. Child window 144 may possess a set of parameters. The set of parameters may include a minimum size parameter, a maximum size parameter, an "exceed minimum" parameter, and an "exceed maximum" parameter as described above.

Figure 2:
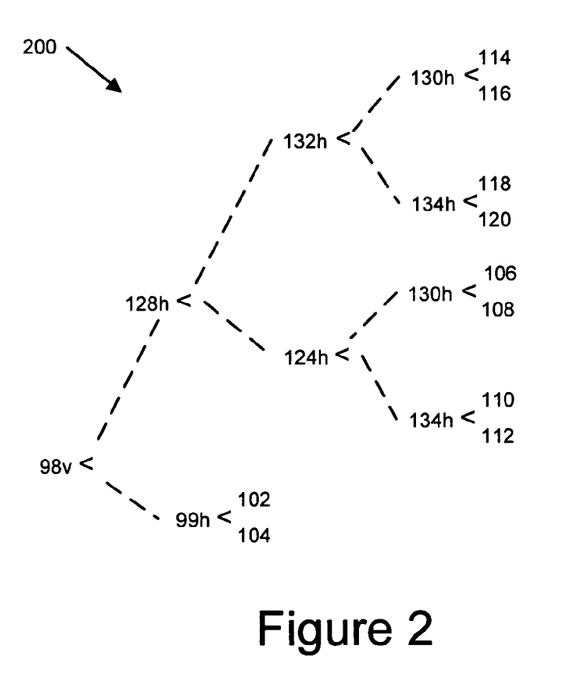
FIG. 2 illustrates an exemplary child window stack tree.

FIG. 2 illustrates an exemplary child window stack tree 200. A stack tree may be referred to as a binary tree and is one method of determining relative position of elements. A stack tree may be used by the sequencing module to determine the order in which the request may be applied to the child windows. Many other methods of determining relative positions of the splitters and windows may be used to determine sequence order. In some embodiments, a stack tree includes markers representing the windows and splitters in the child windows stack including child windows 106 through 120 and splitters 122 through 134. In some embodiments, the stack tree may include the windows and splitters in the docked window environment in addition to those in the child window stack. The physical layout of window stack tree 150 may indicate the structure of a child window stack 140 and all container windows. The structure of the child window stack may refer to the hierarchy or the physical position of the child windows and splitters in the stack in relation to each other. In some embodiments, the child windows may be represented by the leaves of the binary tree such that the branches of the tree may be constructed of splitters and each branch may end in a child window leaf. In some embodiments, the structure of the stack tree may be used to locate the child windows that are adjacent to the splitter. In some embodiments, the stack tree may be used to determine the order of child windows in proximity to a moved splitter. In some embodiments, the stack tree may be used to determine the order of topmost and leftmost window to bottommost and rightmost child window.

In some embodiments, the stack tree may be dynamic or custom created. That is, the tree may be created based on the current activity shown in the docked window environment. In other words, each request to adjust the user interface may trigger the creation of a new child stack tree to be used to implement that request. For example, if splitter 128 in FIG. 1A were to be moved, the stack tree 150 may be created for child stack 140 in relation to splitter 128. That is, the structure or hierarchy of the stack tree may be built to indicate the physical position of each entity in child window stack 140 in relation to splitter 128. If splitter 128 experienced a change in position, a stack tree may include splitter 128 at the top of the hierarchy of child stack 140. For example, the child window stack tree 200 in FIG. 2 may include splitter 98 having two branches, splitter 99 and the child window stack. Splitter 98 may be shown with a trailing "v" indicating it is aligned vertically, whereas splitter 99 may be shown with a trailing "h" indicating it is aligned horizontally. Splitter 128 may be shown at the top of the hierarchy of the child stack tree representing child stack 140.

The child stack tree may have a branch for each splitter and leaf for each child window. Traversing the child stack tree may provide an adjustment order, or order of proximity of the child windows in relation to splitter 128. Here, child window stack tree 200 may indicate that windows 112 and 114 are the most proximate windows to splitter 128. Child window stack tree 200 may indicate that the order of proximity on the push side is window 112, window 110, window 108, and window 106. Child window stack tree 200 may indicate that the order of proximity on the pull side is window 114, window 116, window 118, and window 120. That is, on the push side of the splitter window 112 is the most proximate to splitter 128, while window 106 is the least proximate to splitter 128; and on the pull side of the splitter window 114 is the most proximate while window 120 is the least proximate.

The adjustment order may be used to determine the order of application of available space in the child window stack. In other words, available space may be applied to windows 112 and 114 and if there is remaining available space, then it may be applied to windows 110 and 116, and so forth until the available space is depleted. Each window may be sized to its maximum or minimum size prior to moving to the next window in the adjustment order. The push side and pull side may apply the available space differently depending on the size parameters associated with each child window. Suppose splitter 128 moved in an upward direction to create an available space of 150 pixels. On the pull side the available space may first be applied to enlarge window 114. If, for example, window 114 consumed 25 pixels to reach its maximum size, then (150 pixels−25 pixels) 125 pixels may be applied to the next window in the order of proximity, window 116. If window 116 consumed 50 pixels to reach its maximum size, then (125 pixels–50 pixels) 75 pixels may be applied to the next window in the order of proximity, window 118. Window 118 may consumed the remaining 75 pixels, completing the pull side window adjustments for that change of position of splitter 128. The same procedure may occur substantially simultaneously on the push side of splitter 128. That is, the 150 may be applied to reduce the size of the push side of splitter 128. If window 112 consumes 40 pixels to reach its minimum size, then (150 pixels–40 pixels) 110 pixels may be applied to the next window in the order of proximity, window 110. If window 110 consumes 100 pixels to reach its minimum size, then (110 pixels–100 pixels) 10 pixels may be applied to the next window in the order of proximity, window 108. Window 108 may consume the remaining 10 pixels and may not reach its minimum size completing the push side window adjustments for that change in position of splitter 128.

Figure 3A:
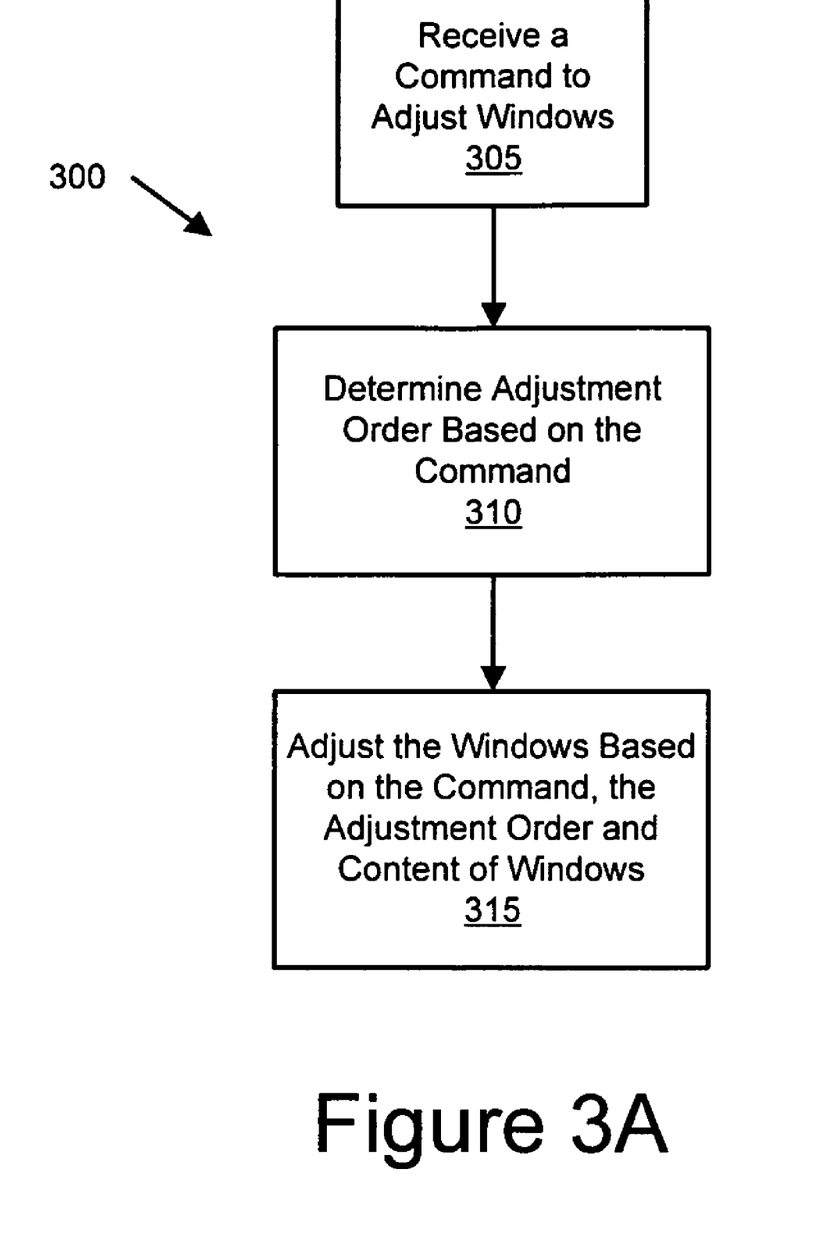
FIG. 3A illustrates an exemplary process for window layout optimization.

In some embodiments, the stack tree may be a static entity. That is, the tree exists independent of the actions in the docked window environment. Here, the structure or hierarchy of the tree may represent the physical relationship of the windows in the child window stack without focus on a particular splitter. This type of stack tree also may be used to determine the relative proximity of the child windows in the stack to splitter 128. In some embodiments, this type of stack tree may be used to determine an order of topmost and leftmost to bottommost and rightmost child window FIG. 3A illustrates an exemplary process 300 for window layout optimization. In some embodiments, window layout optimization includes receiving a request to adjust windows, determining the adjustment order, and adjusting the windows. Here, process action 305 may receive a request to adjust the windows. In some embodiments, a request may be a message, command, or other input (e.g., user, system, default-specified, or other) that, when received, initiates or triggers a responsive action, message, command, action, or data to be sent. Here, the request or command may come in the form of movement of a splitter, the adjustment of a window control element, the addition of a child window, the removal of a child window, or other layout altering manipulations. Each of these or other requests may add or remove space from a child window stack. Process action 310 may determine the adjustment order based on the command or request. In some embodiments, the adjustment order may be based on the movement of a splitter. For example, if a splitter is moved the adjustment order may be based on each window's proximity to the moved splitter such that the child windows closest to the splitter are processed prior to those child windows farther away from the splitter. In some embodiments, the adjustment order may be based on starting with the topmost and leftmost window and ending with the bottommost and rightmost window. For example, if a child window is added to the stack, the space needed to make room for that additional child window may be removed from the other child windows in a topmost and leftmost to bottommost and rightmost order. Process action 315 may adjust the windows based on the request, the adjustment order, and the content of the windows. That is, the adjustment to the child windows may depend on the content in those windows. In some embodiments, the adjustment to the child windows may depend on the "significant" content in the child windows. "Significant" content may refer to the portion of the content that is deemed important or critical to a user for display. There may be a maximum significant content or maximum size parameter and/or a minimum significant content or minimum size parameter for each child window. The maximum size parameter or maximum significant content may determine the maximum content that should be visible or displayed for the child window. The minimum size parameter or minimum significant content may determine the minimum content that should be visible or displayed for the child window. These parameters influence the adjustment made to the child windows as described further in relation to FIG. 4A through FIG. 4D.

Figure 3B:
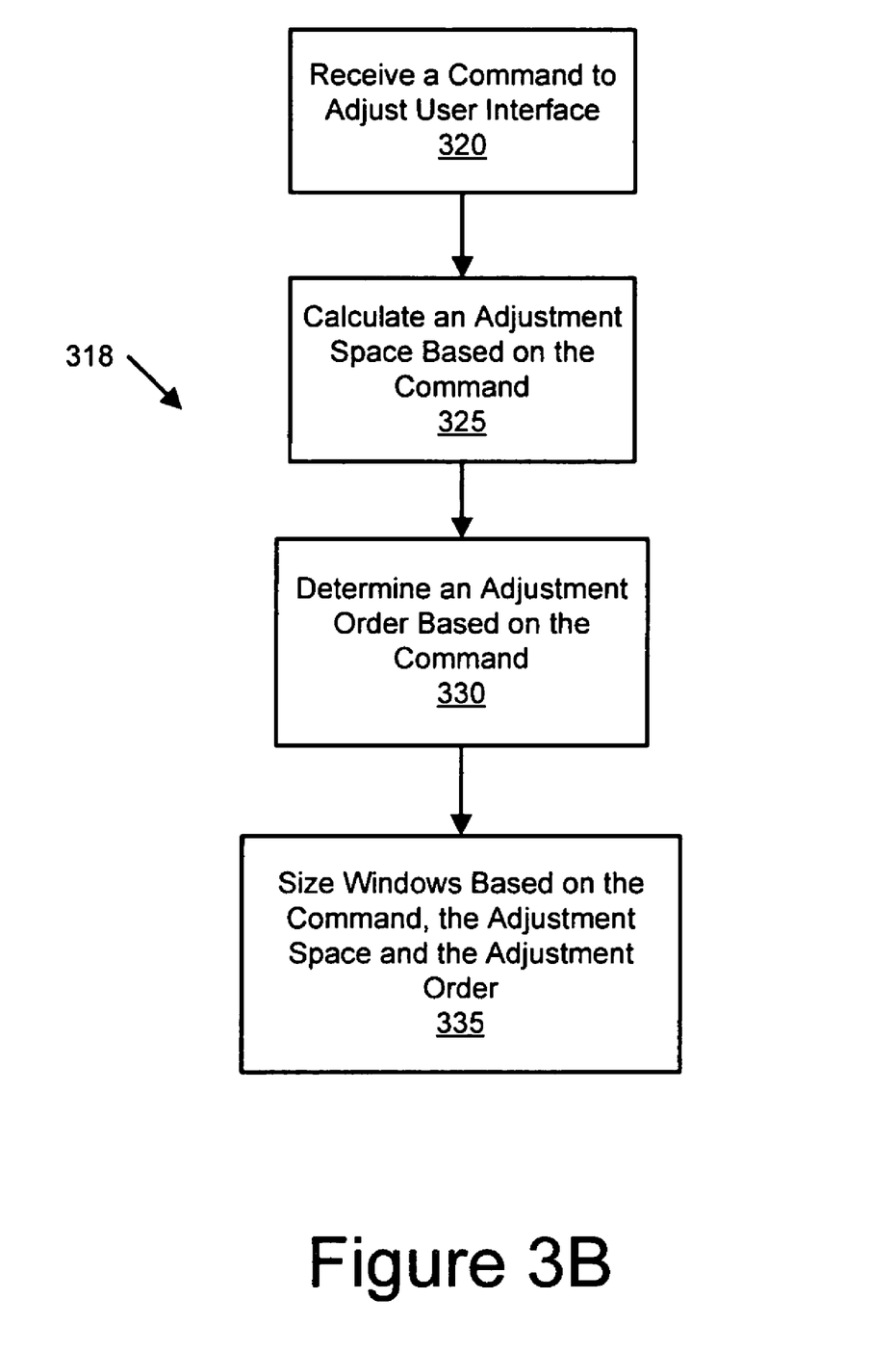
FIG. 3B illustrates an exemplary process for window layout optimization.

FIG. 3B illustrates an exemplary process 318 for window layout optimization. In some embodiments, window layout optimization includes calculating an adjustment space. In process action 320, a request to adjust the user interface or layout may be received. In some embodiments, a request may be a message, command, or other input (e.g., user, system, default-specified, or other) that, when received, initiates or triggers a responsive action, message, command, action, or data to be sent. Here, the request or command may come in the form of movement of a splitter, the adjustment of a window control element, the addition of a child window, the removal of a child window, or other layout altering manipulations. Each of these or other requests may add or remove space from a child window stack. In process action 325, an adjustment space or available space may be calculated. In some embodiments, the adjustment space may be the difference between the beginning size of a container window and the ending size of a container window. In some embodiments, the adjustment size may be the difference between the beginning position of a splitter and the ending position of a splitter. In some embodiments, adjustment space may be the amount of space of an added or removed child window. In process action 330, the adjustment order may be determined. The adjustment order may be a sequence of child windows on which the request is applied successively. That is the request is applied to the child windows in the order of priority that the child windows appear. The adjustment order may be referred to as a sequence, sequence order, window order, application order, order, succession order, window series, or the like. In some embodiments, the adjustment order may be based on window proximity to a moved splitter. In some embodiments, the adjustment order may be based on an order of topmost and leftmost window in the container window to bottommost and rightmost child window in the container window. In process action 335, the child windows may be sized based on the request, the adjustment space, and the adjustment order.

Figure 4A:
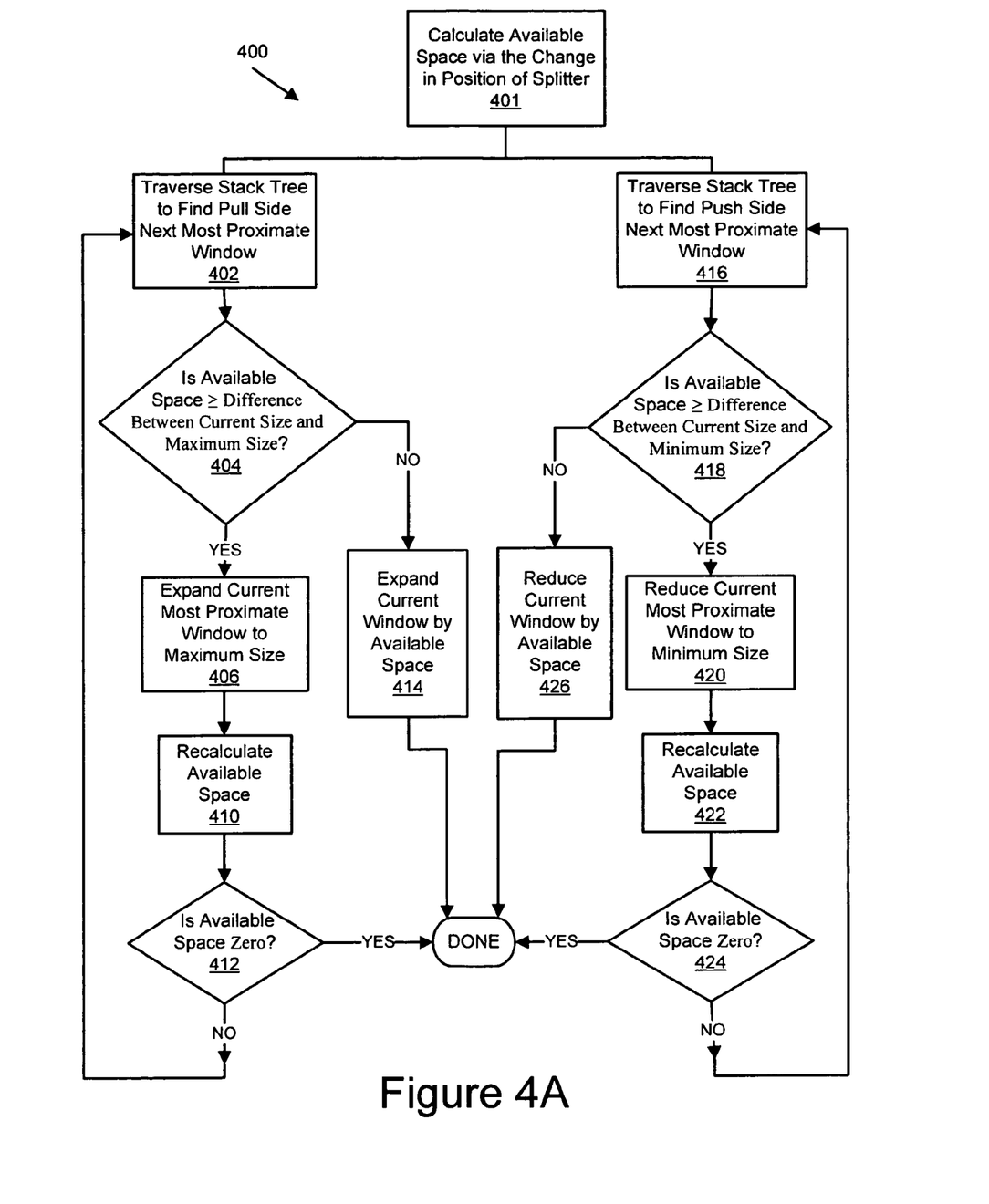
FIG. 4A illustrates an exemplary process for adjusting the windows in order of proximity to the splitter.

FIG. 4A illustrates an exemplary process 400 for adjusting the windows in order of proximity to the splitter. Process action 401 may calculate the available space using the change in position of the splitter. In some embodiments, calculating the available space may refer to calculating a distance. That is, calculating the available space may refer to calculating the distance the splitter travels from its beginning position to its ending position. The distance may be referred to as a length in the case of vertical child stacks or a width in the case of horizontal child stacks. The distance may also be referred to as a change in a dimension of the child window. That is, one of the dimensions (i.e., length or width) of the child window may be adjusted. The units of the distance are not limited and may include inches, centimeters, pixels, proprietary units, or like units of screen space. In some embodiments, calculating the available space using the change in position of the splitter may refer to calculating the area crossed over by the splitter. That is, the movement of the splitter may traverse over an area of the container window or user interface. The length of the splitter multiplied by the distance traveled by the splitter may produce an area of available space. The area of available space may be distributed among the child windows. Process 400 may simultaneously apply the available space to both sides of the splitter.

On the pull side of the splitter, process action 402 may traverse the child stack to determine the next most proximate pull side child window in relation to the splitter that changed position. Process action 404 may determine if the available space or adjustment space is greater than or equal to the difference between the current size of the most proximate window and the maximum size parameter of the most proximate window. If the available space is greater than or equal to the difference between the current size of the child window and its maximum size parameter, then process action 406 may expand the most proximate window to its maximum size. Process action 410 may recalculate the available space. Recalculating the available space includes subtracting the space used to expand the child window to its maximum size from the available space obtained from the change in position of the splitter. For example, if the change in position of the splitter produces an available space of 100 pixels, and 20 pixels are used to enlarge the most proximate child window to its maximum size, then the available space becomes (100 pixels–20 pixels) 80 pixels. The 80 pixels may be applied to other child windows on the pull side of the splitter. Decision block 412 may determine if the available space is zero. That is, decision block 412 may determine if the available space been consumed, used up, or depleted by the adjustment of the child window. If not, process 400 proceeds to process action 402 to find the next most proximate child window on which to apply the remaining available space. Decision block 404 may find that the available space is not greater than or equal to the difference between the current size of the child window and the maximum size of the child window. If the available space is not greater than the difference, process 414 may expand the current child window by the amount of available space. That is, suppose there is a 50 pixel difference between the current size of the child block and its maximum size, but only 25 pixels of available space. The child window may be expanded by 25 pixels. In other words, the 25 pixels of available space may be added to the length of the child window using up the available space and completing process 400 for adjusting the pull side windows in order of proximity to the splitter.

On the push side of the splitter, process action 416 may traverse the child stack to determine the next most proximate push side child window in relation to the splitter that changes position. Decision block 418 may determine if the available space is greater than or equal to the difference between the current size of the most proximate window and the minimum size parameter of the most proximate window. If the available space is greater than or equal to the difference between the current size of the child window and its minimum size parameter then process action 420 may reduce the most proximate window to its minimum size. Process action 422 may recalculate the available space. Recalculating the available space includes subtracting the space used to reduce the child window to its minimum size from the available space obtained from the change in position of the splitter. For example, if the change in position of the splitter produces an available space of 100 pixels, and 35 pixels are used to reduce the most proximate child window to its minimum size, then the available space becomes (100 pixels–35 pixels) 65 pixels. The 65 pixels may be applied to other child windows on the push side of the splitter. Decision block 424 may determine if the available space is zero. That is, decision block 424 may determine if the available space has been consumed, used up, or depleted by the adjustment of the child window(s). If not, process 400 proceeds to process action 416 to find the next most proximate child window on the push side of the splitter on which to apply the remaining available space. Decision block 418 may find that the available space is not greater than or equal to the difference between the current size of the child window and the minimum size of the child window. If the available space is not greater than the difference, process 426 may reduce the current child window by the amount of available space. That is, suppose there is a 50 pixel difference between the current size of the child block and its maximum size, but only 25 pixels of available space. The child window may be reduced by 25 pixels. In other words, the 25 pixels of available space may be taken away from the length of the child window using up the available space and completing process 400 for adjusting the push side windows in order of proximity to the splitter. Alternatively, the child windows may be adjusted beyond their minimum size and maximum size parameters.

Figure 4B:
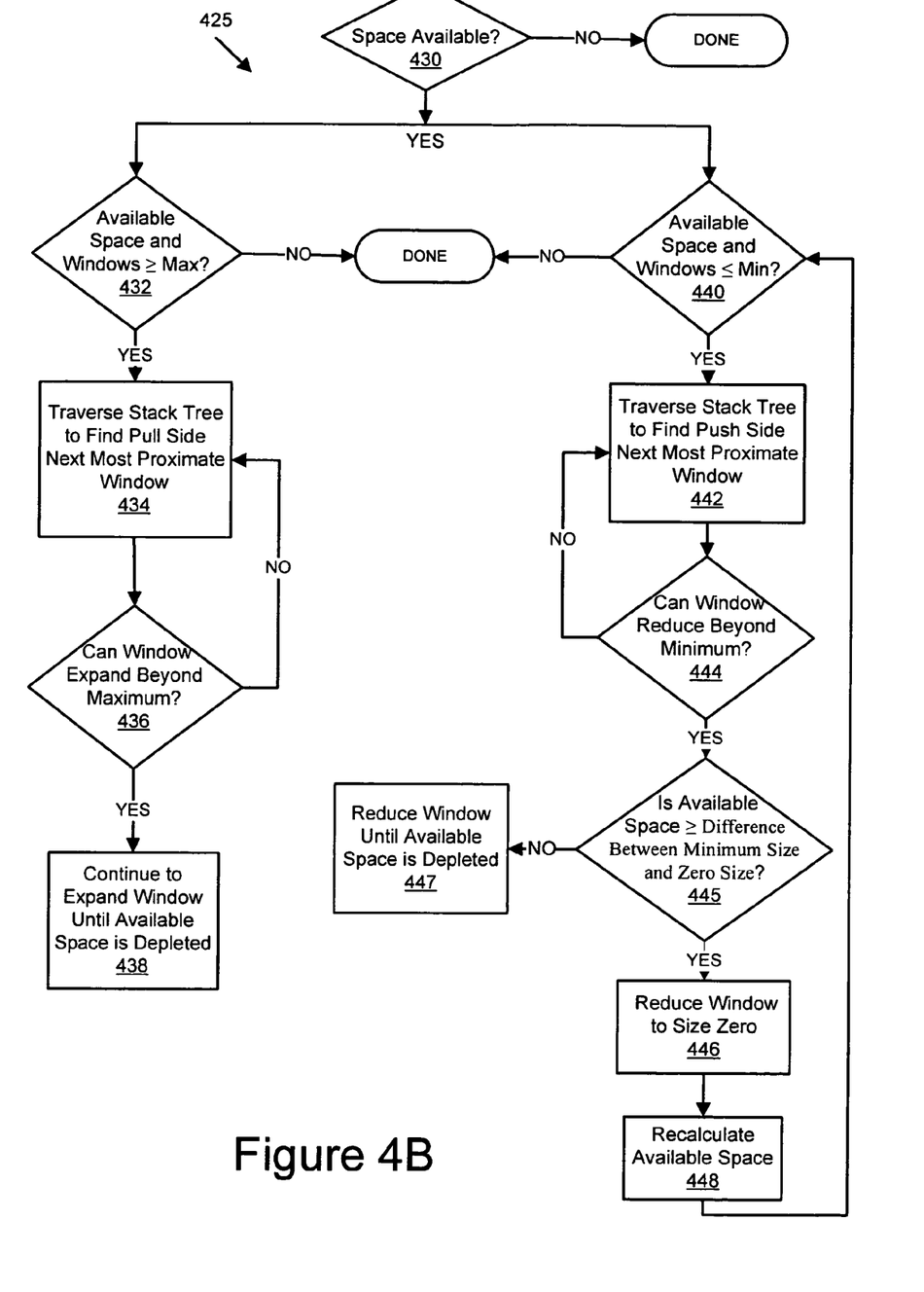
FIG. 4B illustrates an exemplary process for adjusting windows in order of proximity to the splitter beyond the size parameters.

FIG. 4B illustrates an exemplary process 425 for adjusting windows in order of proximity to the splitter beyond the size parameters. Decision block 430 may determine if space is available. If space is available process 425 may proceed in parallel for the push and pull sides of the splitter. On the pull side of the splitter, decision block 432 may determine if space is available and the pull side child windows are at their maximum size. If the pull side windows are at their maximum size and available space remains, then process action 434 may traverse the child stack tree to find the most proximate pull side child window. Decision block 436 may determine if this child window may be expanded beyond the maximum size parameter. If yes, the window is expanded until the available space is consumed. If the window may not be expanded beyond the maximum size parameter, then process 425 returns to process action 434 to find the next most proximate child window. In some embodiments, determining if the child window may be expanded beyond the maximum size parameter may include examination of the "exceed maximum" parameter of the child window. If the exceed maximum parameter indicates that the child window maximum size may be exceeded, then the remaining available space may be applied to the child block. However, if the exceed maximum parameter indicates that the child window may not exceed its maximum size, then the window may not be expanded and an alternate window may be found. The exceed maximum parameter may be included in a control bit, in header information, in metadata information, or the like for the child window. Decision block 432 may determine that there is no more available space or that the pull side windows are not at their maximum size. If so, process 425 is complete or unnecessary for the pull side of the splitter and stops.

On the push side of the splitter, decision block 440 may determine if space is available and the push side child windows are at their minimum size. If the push side windows are at their minimum size and available space remains, then process action 442 may traverse the child stack tree to find the most proximate push side child window. Decision block 444 may determine if this child window may be reduced beyond the minimum size parameter. If yes, decision block 445 may determine if the remaining available space is greater than or equal to the difference between the minimum size of the child window and the zero size. If the available space is large enough, process action 446 may reduce the child window to zero size. In process action 448, the available space may be recalculated. If it is determined in decision block 445 that the available space is not greater than or equal to the difference between the minimum size of the child window and the zero size, then process action 447 may reduce the child block by the amount of available space. If decision block 444 determines that the window may not be reduced beyond the minimum size parameter, then process 425 returns to process action 442 to find the next most proximate push side child window. In some embodiments, determining if the child window may be reduced beyond the minimum size parameter may include examination of the "exceed minimum" parameter of the child window. If the exceed minimum parameter indicates that the child window minimum size may be exceeded, then the remaining available space may be applied to the child block until a size of zero is obtained. However, if the exceed minimum parameter indicates that the child window may not exceed its minimum size, then the window may not be further reduced and an alternate window may be found. The exceed minimum parameter may be included in a control bit, in header information, in metadata information, or the like for the child window. Once a child window is reduced to zero, process action 448 may recalculate available space and return to process action 440 to determine if the windows are at the minimum size and space remains available. Decision block 440 may determine that there is no more available space or that the pull side windows are not at their minimum size. If so, process 425 for the pull side of the splitter is complete, and stops.

Figure 4C:
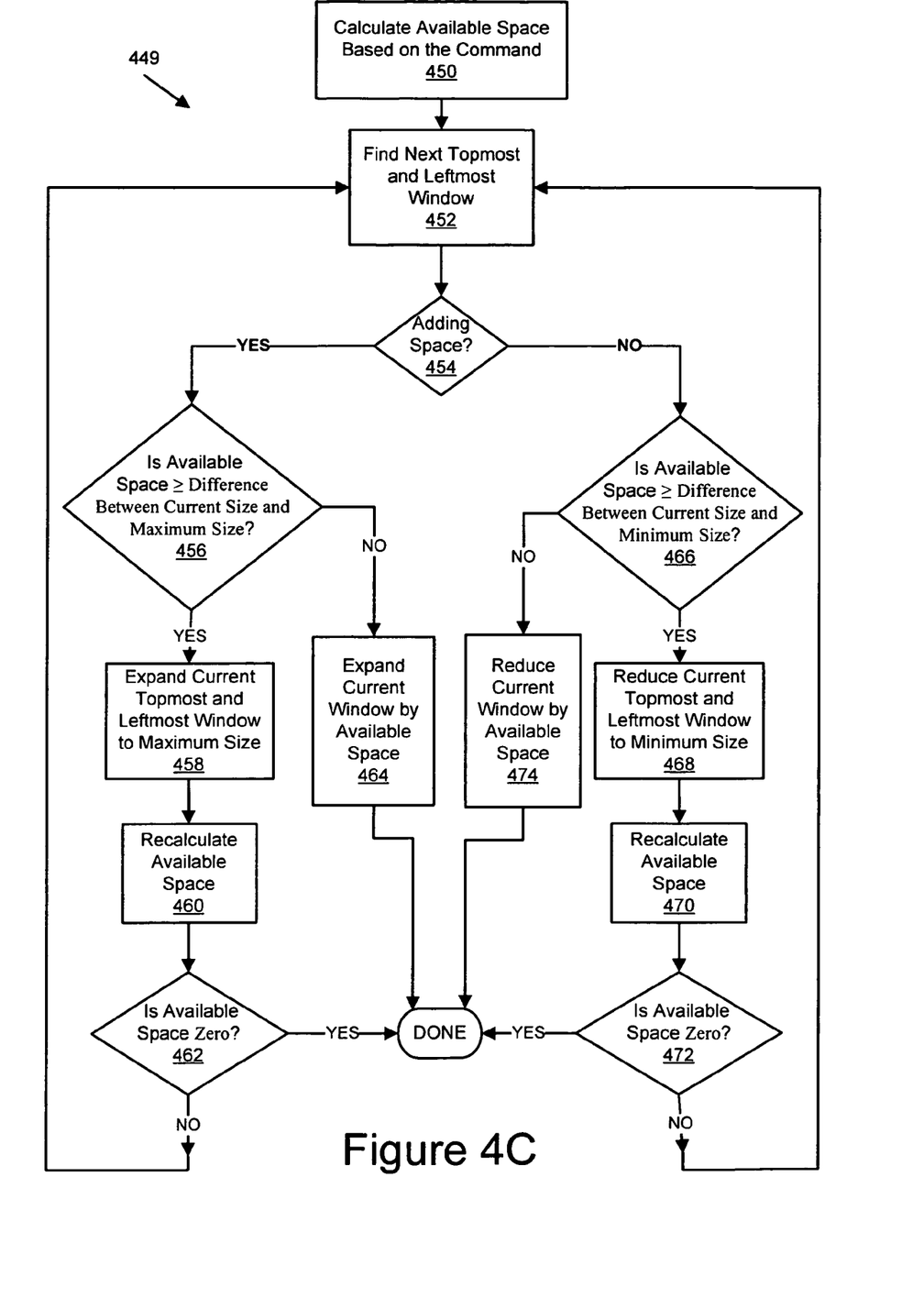
FIG. 4C illustrates an exemplary process for adjusting the windows in order of topmost and leftmost window to bottommost and rightmost window.

FIG. 4C illustrates an exemplary process 449 for adjusting the windows in order of topmost and leftmost window to bottommost and rightmost window. The order of topmost and leftmost window to bottommost and rightmost window may be used when a container window changes size using a splitter or using the window control, when a child window is added to a container window, or when a child window is removed from a container window. In process action 450, the available space may be calculated based on a received request. In some embodiments, available space may be the difference between the beginning size of a container window and an ending size of a container window. In some embodiments, available space may be the size of an added or removed child window. In process action 452, the topmost and leftmost window may be found. To find the topmost and left most window a stack tree may be traversed or other locating mechanism may be used. Decision block 454 may determine if this request is adding space or removing space. If decision block 454 determines that space is being added, the process 449 flows to decision block 456. Decision block 456 may determine if the available space is greater than or equal to the difference between the current size and the maximum size of the child window. If the difference is greater, process action 458 may expand the current topmost and leftmost child window to its maximum size. Process action 460 may recalculate the available space. Decision block 462 may determine if the available space is zero or has been used up. If the available space is zero, process 449 is complete and stops. If the available space is not zero, process 449 returns to process action 452 to find the next topmost and leftmost child window and apply the remaining available space to the next topmost and leftmost child window as described above. The process may continue until the available space is zero (i.e., the space has been consumed, or has been depleted). If decision block 456 determines that the available space is not greater than or equal to the difference between the current size and the maximum size of the child block, then process action 464 expands the current topmost and leftmost child block by the amount of available space.

If decision block 454 determines that space is being removed, then process 449 flows to decision block 466. Decision block 466 may determine if the available space is greater than or equal to the difference between the current size and the minimum size of the child window. If the difference is greater, process action 468 may reduce the current topmost and leftmost child window to its minimum size. Process action 470 may recalculate the available space. Decision block 472 may determine if the available space is zero or has been used up. If the available space is zero, process 449 is complete and stops. If the available space is not zero, process 449 returns to process action 452 to find the next topmost and leftmost child window and apply the remaining available space to the next topmost and leftmost child window as described above. The process may continue until the available space is zero (i.e., the space has been consumed, or has been depleted). If decision block 466 determines that the available space is not greater than or equal to the difference between the current size of the child window and the windows minimum size, then process action 474 may reduce the current child window by the amount of available space.

Figure 4D:
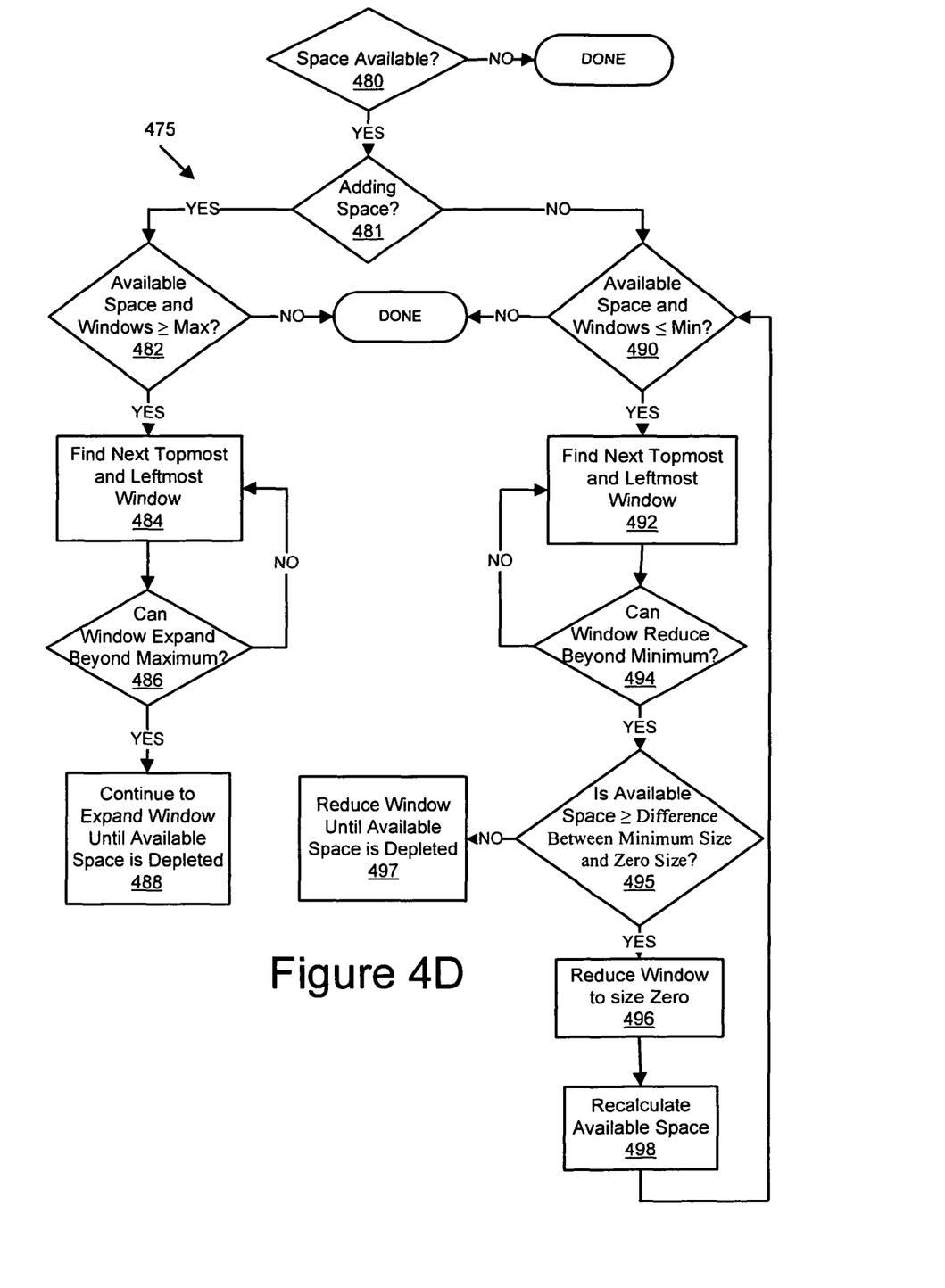
FIG. 4D illustrates an exemplary process for adjusting windows beyond the size parameters in order of topmost and leftmost window to bottommost and rightmost window.

FIG. 4D illustrates an exemplary process 475 for adjusting windows beyond the size parameters in order of topmost and leftmost window to bottommost and rightmost window. Decision block 480 may determine if space remains available. If space is available, decision block 481 may determine if space is being added or removed. If space is being add such as when a container window is enlarged, process 475 proceeds to decision block 482. Decision block 482 may determine if the order of windows from topmost and leftmost through bottommost and rightmost are at their maximum size and available space remains. If so, process action 484 may repeat the order by finding the topmost leftmost child window. Decision block 486 may determine if this child window may be expanded beyond the maximum size parameter. If yes, the window is expanded until the available space is consumed. If the window may not be expanded beyond the maximum size parameter, then process 475 returns to process action 484 to find the next topmost and leftmost child window. In some embodiments, determining if the child window may be expanded beyond the maximum size parameter may include examination of the "exceed maximum" parameter of the child window. If the exceed maximum parameter indicates that the child window maximum size may be exceeded, then the remaining available space may be applied to the child block. However, if the exceed maximum parameter indicates that the child window may not exceed its maximum size, then the window may not be expanded and an alternate window may be found. The exceed maximum parameter may be included in a control bit, in header information, in metadata information, or the like, for the child window. Decision block 482 may determine that there is no more available space or that the child windows are not at their maximum size. If so, process 475 is complete, and stops.

Decision block 481 may determine that space is being removed. If space is being removed such as when a container window is reduced, process 475 proceeds to decision block 490. Decision block 490 may determine if space is available and the child windows are at their minimum size. If the child windows are at their minimum size and available space remains, then process action 492 may repeat the order to find the topmost and leftmost side child window. Decision block 494 may determine if this child window may be reduced beyond the minimum size parameter. If yes, decision block 495 may determine if the remaining available space is greater than or equal to the difference between the minimum size of the child window and the zero size. If the available space is large enough, process action 496 may reduce the child window to zero size. In process action 498, the available space may be recalculated. If it is determined in decision block 495 that the available space is not greater than or equal to the difference between the minimum size of the child window and the zero size, then process action 497 may reduce the child block by the amount of available space. If decision block 494 determines that the window may not be reduced beyond the minimum size parameter, then process 475 may return to process action 492 to find the next topmost and leftmost child window. In some embodiments, determining if the child window may be reduced beyond the minimum size parameter may include examination of the "exceed minimum" parameter of the child window. If the exceed minimum parameter indicates that the child window minimum size may be exceeded, then the remaining available space may be applied to the child block until a size of zero is obtained. However, if the exceed minimum parameter indicates that the child window may not exceed its minimum size, then the window may not be further reduced and an alternate window may be found. The exceed minimum parameter may be included in a control bit, in header information, in metadata information, or the like for, the child window. Once a child window is reduced to zero, process action 498 may recalculate available space and return to process action 490 to determine if available space remains. Decision block 492 may determine that there is no more available space or that the child windows are not at their minimum size. If so, process 475 is complete, and stops.

Figure 5:
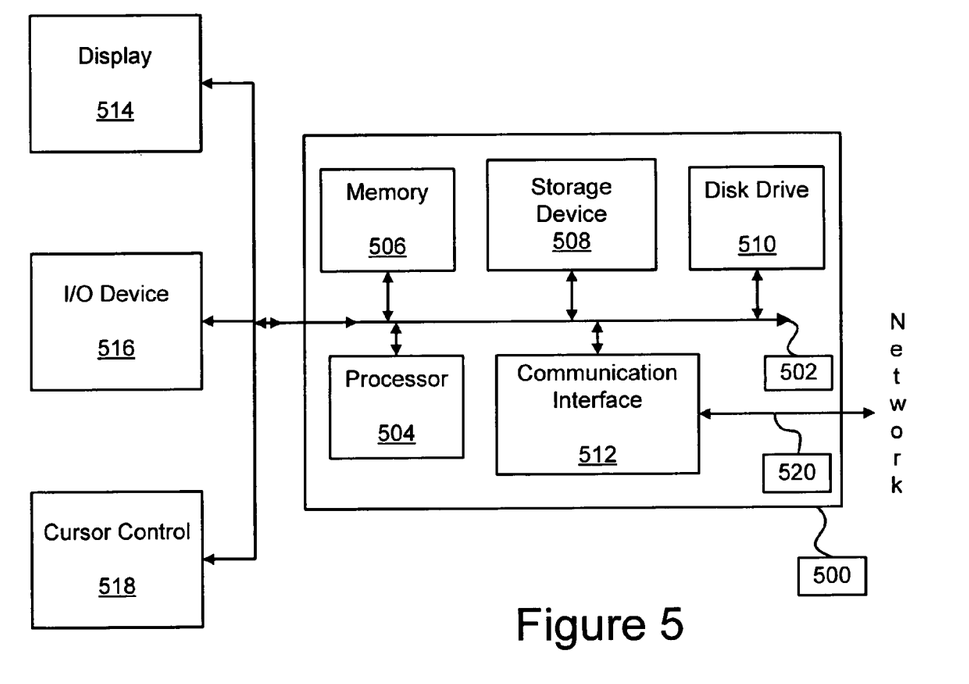
FIG. 5 is a block diagram illustrating an exemplary computer system suitable for content and proximity window layout optimization.

FIG. 5 is a block diagram illustrating an exemplary computer system 500 suitable for content and proximity window layout optimization. In some embodiments, computer system 500 may be used to implement computer programs, applications, methods, or other software to perform the above-described techniques for fabricating storage systems such as those described above. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some embodiments of the invention, computer system 500 performs specific operations by processor 504 executing one or more sequences of one or more instructions stored in system memory 506. Such instructions may be read into system memory 506 from another computer readable medium, such as static storage device 508 or disk drive 510. In some embodiments, hard-wired circuitry may be used in place of or in combination with software instructions to implement the invention.

The term "computer readable medium" refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments of the invention, execution of the sequences of instructions to practice the invention is performed by a single computer system 500. According to some embodiments of the invention, two or more computer systems 500 coupled by communication link 520 (e.g., LAN, PSTN, or wireless network) may perform the sequence of instructions to practice the invention in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing embodiments have been described in some detail for purposes of clarity of understanding, implementations of the above-described system and techniques is not limited to the details provided. There are many alternative implementations and the disclosed embodiments are illustrative and not restrictive.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method, comprising:
receiving a resizing request in regard to a plurality of windows in a user interface wherein the resizing request is generated using a manipulation element of the user interface, the plurality of windows having content;
determining a sequence of the plurality of windows, wherein the sequence is determined dependent on respective proximities of the plurality of windows to the manipulation element; and
adjusting the plurality of windows based on the request, the sequence, and the content of the one or more windows being adjusted, wherein said adjusting is performed successively on each window according to the sequence such that one or more of the plurality of windows closest to the manipulation element are adjusted prior to adjusting one or more windows farther from the manipulation element, wherein said adjusting comprises adjusting one of the plurality of windows in the sequence in response to determining that a previous window in the sequence has been adjusted to a maximum or minimum size such that the window is not adjusted until the previous window in the sequence has reached the maximum or minimum size, wherein the maximum or minimum size is dependent on an amount of content in the previous window.

2. The method of claim 1, wherein the manipulation element corresponds to a splitter and wherein receiving the resizing request further comprises:
detecting a change in position of the splitter, the splitter separating a plurality of child windows within the user interface; and
calculating an available space, the available space being calculated based on a difference between a beginning position of the splitter and an ending position of the splitter.

3. The method of claim 2, wherein adjusting the plurality of windows further comprises applying the available space to enlarge a first window on a first side of the splitter and applying the available space to reduce a second window on a second side of the splitter, the enlarging and reducing occurring substantially simultaneously.

4. The method of claim 2, wherein the sequence of windows is in an order of proximity to the splitter.

5. The method of claim 1, wherein receiving the resizing request further comprises receiving a request to add another window to the user interface.

6. The method of claim 1, wherein receiving the resizing request further comprises receiving a request to remove one of the plurality of windows from the user interface.

7. The method of claim 1, wherein receiving the resizing request further comprises receiving a request to size a container window, the container window having one or more of the plurality of windows.

8. The method of claim 1, wherein the sequence of windows is in order of a leftmost and topmost window in the user interface to a bottommost and rightmost window in the user interface.

9. The method of claim 1, wherein the adjusting the plurality of windows further comprises applying an available space to the one or more windows of the plurality of windows according to the sequence until the available space is depleted, the available space comprising a quantity of screen space.

10. The method of claim 9, wherein applying the available space to the one or more windows in the sequence further comprises enlarging a first window in the sequence to a maximum size or reducing the first window in the sequence to a minimum size prior to enlarging or reducing a second window in the sequence, the maximum size comprising a parameter indicating a maximum of content for display, the minimum size comprising another parameter indicating a minimum of content for display.

11. The method of claim 9, wherein applying the available space to the one or more windows in the sequence further comprises each of the one or more windows using a portion of the available space, the portion being less than or equal to an amount of space used to adjust the one or more windows from a current size to a respective minimum or maximum size.

12. The method of claim 9, wherein applying the available space to the one or more windows in the sequence further comprises each of the one or more windows using a portion of the available space, the portion being greater than or equal to an amount of space used to adjust the one or more windows from a current size to a respective minimum or maximum size if additional available space remains after the one or more windows are adjusted.

13. A method, comprising:
receiving a request to adjust a user interface, the user interface having a plurality of container windows separated by splitters, the request being made by an adjustment of one of the splitters, the container windows having a plurality of child windows, the child windows comprising content, wherein at least one of the plurality of container windows has a plurality of child windows;
calculating an adjustment space, the adjustment space comprising a portion of screen space made available by the adjustment of the user interface;
determining a sequence of child windows, wherein the sequence is determined dependent on respective proximities of the child windows to the one of the splitters; and
sizing the plurality of child windows in the sequence based on the request to adjust the user interface, the adjustment space, and the sequence, wherein said sizing is performed successively on each window according to the sequence and comprises adjusting one of the child windows in the sequence in response to determining that a previous child window in the sequence has been adjusted to a maximum or minimum size such that the child window is not adjusted until the previous child window in the sequence has reached the maximum or minimum size, wherein the maximum or minimum size is dependent on an amount of content in the previous child window.

14. The method of claim 13, wherein the sequence is the sequence of the child windows as bounded by a topmost and leftmost window and a bottommost and rightmost window when the request to adjust the user interface includes a size change of one or more of the plurality of container windows, or adding a child window to or removing a child window from the plurality of container windows.

15. The method of claim 13, wherein the sequence is ordered by proximity of the child windows to the one of the splitters when the request to adjust the user interface includes a change in position of the one of the splitters to adjust a size of the child windows, the one of the splitters being configured to separate the child windows.

16. The method of claim 15, wherein the plurality of child windows are sized by expanding a first child window size on a first side of the one of the splitters and reducing a second child window size on a second side of the one of the splitters, the expanding and reducing occurring substantially simultaneously.

17. The method of claim 13, wherein sizing the plurality of child windows based on the request to adjust the user interface further comprises applying the adjustment space to the plurality of child windows successively until the adjustment space is consumed.

18. The method of claim 13, wherein sizing the plurality of child windows based on the request to adjust the user interface further comprises applying a first portion of the adjustment space to size a first child window in the sequence to a maximum or minimum size prior to applying a second portion of the adjustment space to a second child window in the sequence, the maximum size being a first size parameter at which a maximum content is displayed, the minimum size being a second size parameter at which a minimum of content is displayed.

19. The method of claim 18, wherein sizing the plurality of child windows based on the request to adjust the user interface further comprises sizing a first child window in the sequence beyond the maximum or minimum size when the adjustment space is available, wherein the plurality of child windows being adjusted are at the maximum size or the minimum size, and a first child window exceed parameter indicates that the first child window exceeds the first size parameter.

20. A computer system, comprising:
a processor; and
memory coupled to the processor and configured to store program instructions executable by the processor to implement:
a user interface including a plurality of container windows separated by one or more container splitters, wherein at least one of the plurality of container windows has a plurality of child windows separated by one or more child splitters, wherein each child window has content, and the user interface is configured to receive a command to adjust one or more of the plurality of child windows, the command being generated by adjustment of one of the child splitters;
a sequencing module configured to determine a sequence of child windows, wherein the sequence of child windows is determined dependent on respective proximities of the child windows in the user interface to the one of the child splitters; and
an adjusting module configured to adjust the plurality of child windows in the sequence based on the command, the child window sequence, and the content of each child window of the plurality of child windows being adjusted, wherein said adjusting is performed successively on each child window in the sequence and comprises adjusting one of the child windows in the sequence in response to determining that a previous child window in the sequence has been adjusted to a maximum or minimum size such that the child window is not adjusted until the previous child window in the sequence has reached the maximum or minimum size, wherein the maximum or minimum size is dependent on an amount of content in the previous child window.

21. The system of claim 20, wherein the user interface receives the command based on the movement of the one of the child splitters.

22. The system of claim 20, wherein the sequencing module is further configured to determine whether the child window sequence is a proximity sequence, the proximity sequence being a child window sequence in which the child windows are displayed in an order of proximity to the adjusted one of the child splitters.

23. The system of claim 22, wherein the adjusting module is further configured to adjust a first proximate child window to a maximum size or a minimum size before adjusting a second proximate child window, the maximum size displaying a maximum of content, the minimum size displaying a minimum of content.

24. The system of claim 20, wherein the adjusting module is further configured to adjust the plurality of child windows in the window sequence until an available space has been depleted, the available space being determined by the area difference between a starting position of the one of the splitters and an ending position of the one of the splitters.

25. The system of claim 20, wherein the user interface is further configured to receive another command to adjust a size of one of the plurality of container windows.

26. The system of claim 20, wherein the user interface is further configured to receive another command to add a child window to one of the plurality of container windows or to delete one of the plurality of child windows from a container window.

27. The system of claim 20, wherein the sequencing module is further configured to determine the child window sequence to start at a top left position and to end at a bottom right position of the one or more of the plurality of container windows.

28. A computer program product embodied in a computer readable storage medium and comprising computer instructions for:
   receiving a resizing request in regard to a plurality of windows in a user interface wherein the resizing request is generated using a manipulation element of the user interface, the plurality of windows having content;
   determining a sequence of the plurality of windows, wherein the sequence is determined dependent on respective proximities of the plurality of windows to the manipulation element; and
   adjusting the plurality of windows based on the request, the sequence, and the content of the one or more windows being adjusted, wherein said adjusting is performed successively on each window according to the sequence such that one or more of the plurality of windows closest to the manipulation element are adjusted prior to adjusting one or more windows farther from the manipulation element, wherein said adjusting comprises adjusting one of the plurality of windows in the sequence in response to determining that a previous window in the sequence has been adjusted to a maximum or minimum size such that the window is not adjusted until the previous window in the sequence has reached the maximum or minimum size, wherein the maximum size is dependent on an amount of content in the previous window.

29. A computer program product embodied in a computer readable storage medium and comprising computer instructions for:
   receiving a request to adjust a user interface, the user interface having a plurality of container windows separated by splitters, the request being made by an adjustment of one of the splitters, the container windows having a plurality of child windows, the child windows comprising content, wherein at least one of the plurality of container windows has a plurality of child windows;
   calculating an adjustment space, the adjustment space comprising a portion of screen space made available by the adjustment of the user interface;
   determining a sequence of child windows, wherein the sequence is determined dependent on respective proximities of the child windows to the one of the splitters; and
   sizing the plurality of child windows in the sequence based on the request to adjust the user interface, the adjustment space, and the sequence, wherein said sizing is performed successively on each child window according to the sequence and comprises adjusting one of the child windows in the sequence in response to determining that a previous child window in the sequence has been adjusted to a maximum or minimum size such that the child window is not adjusted until the previous child window in the sequence has reached the maximum or minimum size, wherein the maximum size is dependent on an amount of content in the previous child window.

* * * * *